(12) United States Patent
Kubinec et al.

(10) Patent No.: US 8,535,531 B2
(45) Date of Patent: Sep. 17, 2013

(54) HALOGENATED RESIN BEDS

(75) Inventors: James J. Kubinec, Reno, NV (US);
Roger Eric Johnson, Reno, NV (US)

(73) Assignee: Water Security Corporation, Sparks, NV (US)

( * ) Notice: Subject to any disclaimer, the term of this patent is extended or adjusted under 35 U.S.C. 154(b) by 619 days.

(21) Appl. No.: 12/429,057

(22) Filed: Apr. 23, 2009

(65) Prior Publication Data

US 2009/0266758 A1 Oct. 29, 2009

Related U.S. Application Data

(60) Provisional application No. 61/047,271, filed on Apr. 23, 2008.

(51) Int. Cl.
*B01D 15/04* (2006.01)
*B01D 15/00* (2006.01)
*B01D 27/00* (2006.01)
*B01D 29/00* (2006.01)
*B01D 35/00* (2006.01)

(52) U.S. Cl.
USPC ........... 210/263; 210/348; 210/435; 210/749; 210/753

(58) Field of Classification Search
USPC .................... 210/170.07, 263, 282, 283, 287, 210/348, 435, 446, 749, 753
See application file for complete search history.

(56) References Cited

U.S. PATENT DOCUMENTS

| | | | |
|---|---|---|---|
| 2,920,050 A | 1/1960 | Blacet et al. | |
| 3,355,317 A | 11/1967 | Keith, II et al. | |
| 3,425,790 A | 2/1969 | Sloan | |
| 4,298,475 A | 11/1981 | Gartner | |
| 4,420,590 A | 12/1983 | Gartner | |
| 4,828,698 A | 5/1989 | Jewell et al. | |
| 4,995,976 A | 2/1991 | Vermes et al. | |
| 5,063,196 A | 11/1991 | Doughty et al. | |
| 5,407,573 A | 4/1995 | Hughes | |
| 5,456,831 A | 10/1995 | Sullivan | |
| 5,468,373 A | 11/1995 | Chou | |
| 5,492,882 A | 2/1996 | Doughty et al. | |
| 5,518,613 A | 5/1996 | Koczur et al. | |

(Continued)

FOREIGN PATENT DOCUMENTS

| | | |
|---|---|---|
| GB | 1072227 | 7/1967 |
| WO | WO 95/29878 | 11/1995 |
| WO | WO 2008/025356 | 3/2008 |

OTHER PUBLICATIONS

Gerba and Naranjo, "Microbiological Water Purification Without the Use of Chemical disinfection," Wilderness and Environmental Medicine, vol. 11, pp. 12-16 (2000).

(Continued)

*Primary Examiner* — John Kim
(74) *Attorney, Agent, or Firm* — K&L Gates LLP (57) ABSTRACT

A water treatment system may generally comprise a generally cylindrical halogenated resin bed comprising an empty bed contact time greater than 1 second, an aspect ratio less than 0.8, and a fluid velocity less than 0.5 cm/s, wherein the aspect ratio is the ratio of the length of the halogenated resin bed to the diameter of the halogenated resin bed; and wherein the fluid velocity is the quotient of the volumetric flow rate of the water treatment system and the cross-sectional area of the halogenated resin bed; and wherein the halogenated resin bed improves the removal of contaminates relative to a corresponding water treatment system having an aspect ratio greater than 0.8.

13 Claims, 2 Drawing Sheets

(56) References Cited

U.S. PATENT DOCUMENTS

| | | | |
|---|---|---|---|
| 5,562,824 | A | 10/1996 | Magnusson |
| 5,624,567 | A | 4/1997 | Colombo |
| 5,635,063 | A | 6/1997 | Rajan et al. |
| 5,714,126 | A | 2/1998 | Frund |
| 5,980,827 | A | 11/1999 | Messier |
| 6,572,769 | B2 | 6/2003 | Rajan et al. |
| 6,696,055 | B2 | 2/2004 | Messier |
| 6,838,005 | B2 | 1/2005 | Tepper et al. |
| 6,899,868 | B2 | 5/2005 | Messier |
| 6,959,820 | B2 | 11/2005 | Koslow |
| 7,261,879 | B2 | 8/2007 | Messier |
| 2002/0117436 | A1 | 8/2002 | Rajan et al. |
| 2008/0011662 | A1 | 1/2008 | Milosavljevic et al. |

OTHER PUBLICATIONS

Sakoda, et al., "Adsorption of Viruses in Water Environment onto Solid Surfaces," Wat. Sci. Tech., vol. 35, No. 7, pp. 107-114 (1997).

Azadpour-Keeley, et al., "Movement and Longevity of Viruses in the Subsurface," EPA Ground Water Issue, pp. 1-25, (Apr. 2003).

Koslow, "Carbon Breakthrough: New Microbiological Reduction Capabilities Overcome Market Barriers," Water Conditioning & Purification, pp. 50-53, (Jan. 2004).

Battelle Lifestraw Report; Frauchiger, "Final Report: Iodine/Iodide Release Efficiency of Lifestraw™ LF64, (Non-GLP Study)," Study No. A-82-05-04, May 31, 2006, Preliminary Test Results, obtained from www.lifestraw.com/en/low/test_result.pdf, (7 pages).

Laease Group Technologies De Sante LifeStraw Report; Nibouche, Efficacy of LifeStraw Systems LF 64, Jul. 7, 2006, Preliminary Test Results, obtained from www.lifestraw.com/en/low/test_result.pdf, (6 pages).

Epic Water Systems, Dec. 24, 2009, pp. 1-2, http://www.epicwater.com/new/Products/mcvresin.htm.

Zeta Plus Media Matrix for Pharmaceutical, Biological and Bioprocessing Applications, Dec. 24, 2009, 1 page, http://solutions.3m.uk/3MContentRetrievalAPI/BlobServlet?locale=en_GB&Imd=1220368054000&assetId=1180601688484&assetType=MMM_Image&blobAttribute=ImageFile.

International Search Report and Written Opinion mailed Feb. 22, 2007 in International Application No. PCT/US2006/038106.

International Preliminary Report on Patentability mailed Oct. 30, 2008 in International Application No. PCT/US2006/038106.

International Search Report and Written Opinion mailed Feb. 6, 2009 in International Application No. PCT/US2008/007545.

International Preliminary Report on Patentability mailed Jan. 14, 2010 in International Application No. PCT/US2008/007545.

International Search Report and Written Opinion mailed Sep. 17, 2009 in International Application No. PCT/US2009/050273.

International Search Report and Written Opinion mailed Feb. 8, 2010 in International Application No. PCT/US2009/063443.

Office Action dated Mar. 9, 2009 in U.S. Appl. No. 11/540,498.

Office Action dated Aug. 14, 2009 in U.S. Appl. No. 11/540,498.

Office Action dated Dec. 31, 2009 in U.S. Appl. No. 11/540,498.

Office Action dated Jan. 27, 2010 in U.S. Appl. No. 11/823,804.

International Search Report and Written Opinion mailed Oct. 23, 2009 in corresponding International Application No. PCT/US2009/041574.

UMPQUA Research Co., URC 8058, Sep. 2007, pp. 1-2, http://chemlab.cc/umpqua.pdf.

PUROPACK from Purolite—The Next Generation Packed Bed Ion Exchange Technology for Water Treatement Plants 1999, pp. 1-4, http://www.purolite.com.br/downloads/Brochuras/puropack%20bROCHURE.pdf.

FIG. 2

HALOGENATED RESIN BEDS

CROSS-REFERENCE TO RELATED APPLICATIONS

This application claims the benefit under 35 U.S.C. §119(e) of U.S. Provisional Application No. 61/047,271, filed on Apr. 23, 2008.

BACKGROUND

The water treatment systems described herein generally relate to water treatment systems comprising halogenated resin beds suitable for removing contaminants from water.

Over one billion people lack access to reliable and sufficient quantities of safe or potable drinking water. Waterborne contaminants may pose a critical health risk to the general public, including vulnerable populations, such as children, the elderly, and those afflicted with disease, if not removed from drinking water. An estimated six million people die each year, half of which are children under 5 years of age, from contaminated drinking water. The U.S. Environmental Protection Agency Science Advisory Board considers contaminated drinking water one of the public's greatest health risks.

Many people rely on groundwater as their only source of water. Groundwater was believed to be relatively pure due to its percolation through the topsoil; however, research has shown that up to 50% of the active groundwater sites in the United States test positive for waterborne contaminants. Waterborne contaminants may include microorganisms or microbes, including viruses, such as enteroviruses (polio, Coxsackie, echovirus, hepatitis), rotaviruses and other reoviruses, adenoviruses Norwalk-type agents, other microbes including fungi (including molds and yeasts), bacteria (including *salmonella, shigella, yersinia, mycobacteria, enterocolitica, E. coli, Campylobacter, Legionella, Cholera*), flagellates, amoebae, *Cryptosporidium, Giardia*, other protozoa, prions, proteins and nucleic acids, pesticides and other agrochemicals, including organic chemicals, inorganic chemicals, halogenated organic chemicals and other debris. Accordingly, the removal of waterborne contaminants may be necessary to provide potable drinking water for the general public; water for emergency use during natural disasters and terrorist attacks; water for recreational use, such as hiking and camping; and water for environments in which water must be recirculated, such as aircraft and spacecraft.

Water treatment systems comprising a halogenated resin have been successfully used to remove microbiological pathogens from water. A conventional water treatment system may generally comprise a cylindrical halogenated resin bed comprising a length at least two times greater than its diameter. This may be problematic because of the relatively high cost of halogenated resins and the relatively high manufacturing costs of water treatment systems Therefore, a more efficient and/or inexpensive water treatment system is desirable.

SUMMARY

According to certain embodiments, a more efficient and/or more cost-effective water treatment system is described.

In certain embodiments, a water treatment system may generally comprise a generally cylindrical halogenated resin bed comprising an empty bed contact time greater than 1 second, an aspect ratio less than 0.8, and a fluid velocity less than 0.5 cm/s, wherein the aspect ratio is the ratio of the length of the halogenated resin bed to the diameter of the halogenated resin bed; and wherein the fluid velocity is the quotient of the volumetric flow rate of the water treatment system and the cross-sectional area of the halogenated resin bed; and wherein the halogenated resin bed improves the removal of contaminates relative to a corresponding water treatment system having an aspect ratio greater than 0.8.

DESCRIPTION OF THE DRAWINGS

The various embodiments of water treatment systems described herein may be better understood by considering the following description in conjunction with the accompanying drawings.

DESCRIPTION OF CERTAIN EMBODIMENTS

A. Definitions

As generally used herein, the term "comprising" refers to various components conjointly employed in the manufacture and/or use of the water treatment systems described herein. Accordingly, the terms "consisting essentially of" and "consisting of" are embodied in the term "comprising".

As generally used herein, the articles including "the", "a" and "an" refer to one or more of what is claimed or described.

As generally used herein, the terms "include", "includes" and "including" are meant to be non-limiting.

As generally used herein, the terms "have", "has" and "having" are meant to be non-limiting.

All numerical quantities stated herein are approximate unless stated otherwise, meaning that the term "about" may be inferred when not expressly stated. The numerical quantities disclosed herein are to be understood as not being strictly limited to the exact numerical values recited. Instead, unless stated otherwise, each numerical value is intended to mean both the recited value and a functionally equivalent range surrounding that value. Notwithstanding the approximations of numerical quantities stated herein, the numerical quantities described in specific examples of actual measured values are reported as precisely as possible.

All numerical ranges stated herein include all sub-ranges subsumed therein. For example, a range of "1 to 10" is intended to include all sub-ranges between and including the recited minimum value of 1 and the recited maximum value of 10. Any maximum numerical limitation recited herein is intended to include all lower numerical limitations. Any minimum numerical limitation recited herein is intended to include all higher numerical limitations.

As generally used herein, the term "contaminant" refers to any undesirable agent in a fluid, for example, a gas, vapor, liquid, or solution. "Contaminant" includes, for example, but not limited to, microorganisms or microbes (as well as reproductive forms of microorganisms, including cysts and spores) including viruses, such as enteroviruses (polio, Coxsackie, echovirus, hepatitis, calcivirus, astrovirus), rotaviruses and other reoviruses, adenoviruses Norwalk-type agents, Snow Mountain agent, fingi (including molds and yeasts); helminthes; bacteria (including *salmonella, shigella, yersinia*, fecal coliforms, mycobacteria, enterocolitica, *E. coli, Campylobacter, Serratia, Streptococcus, Legionella, Cholera*); flagellates; amoebae; *Cryptosporidium, Giardia*, other protozoa; prions; and proteins and nucleic acids.

As generally used herein, the term "removing contaminants" refers to disarming one or more contaminants in the fluid, whether by physically and/or chemically removing, reducing, destroying, modifying, inactivating, and/or separating the contaminants, or otherwise rendering the one or more contaminants harmless. In certain embodiments, it may include removing one or more contaminants but specifically excluding one or more types, groups, categories or specifically identified contaminants. In certain embodiments, it may include one or more contaminants, or may include only one particular contaminant, or may specifically exclude one or more contaminants.

As generally used herein, the term "log reduction value" refers to the $\log_{10}$ of the level of contaminants, typically the number of microorganisms, in the influent divided by the level of contaminants, typically the number of microorganisms, in the effluent. For example, a log 4 reduction in contaminants is >99.99% reduction in contaminants and a log 5 reduction in contaminants is >99.999% reduction in contaminants.

As generally used herein, the term "microbial kill" refers to bactericidal and virucidal properties.

As generally used herein, the term "residual iodine" refers to iodine remaining in the fluid. In certain embodiments, the residual iodine may be 0.5-4.0 mg/L.

As generally used herein, the term "sorbent media" refers to any material that may absorb or adsorb at least one contaminant and/or at least one halogen. In general, "absorbent" materials may include materials capable of drawing substances, including contaminants, into their surfaces or structures, and "adsorbent" materials may include materials that are capable of physically holding substances, including contaminants, on their outer surfaces.

This disclosure describes various features, aspects, and advantages of various embodiments of water treatment systems. It is understood, however, that this disclosure embraces numerous alternative embodiments that may be accomplished by combining any of the various features, aspects, and advantages of the various embodiments described herein in any combination or sub-combination that one of ordinary skill in the art may find useful. For example, certain embodiments described herein may be suitable for home water treatment or public water treatment.

B. Overview

A water treatment system comprising a halogenated resin bed may release an effective amount of halogens into contaminated fluid passing therethrough to remove contaminants therein. Without intending to be bound to any particular theory, the removal of contaminants by a water treatment system comprising a halogenated resin bed may be described by Equation (1):

$$\text{Removal} \propto V \times (EBCT) \qquad (1)$$

where V is the volume of the halogenated resin bed and EBCT is the empty bed contact time of the fluid passing therethrough.

As shown by Equation (1), the removal of contaminants by a water treatment system may generally depend on the volume of the halogenated resin bed. The volume of a cylindrical halogenated resin bed may be described by Equation (2):

$$V = A \times L \qquad (2)$$
$$= \frac{\pi D^2}{4} L$$

where A is the area of the halogenated resin bed, L is the length of the halogenated resin bed, and D is the diameter of the halogenated resin bed. As shown by Equation (2), the volume of the halogenated resin bed may be increased by increasing its length.

As shown by Equation (1), the removal of contaminants by a water treatment system may also generally depend on the EBCT. The EBCT of a halogenated resin bed may be described by Equation (3):

$$(EBCT) = \frac{V}{F} \qquad (3)$$

where V is the volume of the halogenated resin bed and F is the volumetric flow rate of the water treatment system. As generally used herein, the term "EBCT" refers to the period of time that the fluid remains in contact with the halogenated resin bed. As shown by Equation (3), the EBCT of a water treatment system may be increased by increasing the volume of the halogenated resin. As shown by Equation (2), the volume of the halogenated resin bed may be increased by increasing its length.

According to the general principles of water treatment and design described above, a conventional water treatment system may generally be designed to maximize the length of the halogenated resin bed to increase its volume. Accordingly, a conventional water treatment system may generally comprise a cylindrical halogenated resin bed comprising a length at least two times greater than its width, or an aspect ratio of at least 2.

C. Water Treatment Systems

In certain embodiments, a water treatment system may generally comprise a generally cylindrical halogenated resin bed comprising an empty bed contact time greater than 1 second, an aspect ratio less than 0.8, and a fluid velocity less than 0.5 cm/s; wherein the aspect ratio is calculated according to Equation (4):

$$\text{aspect ratio} = \frac{L}{D} \qquad (4)$$

where L is the length of the halogenated resin bed and D is the diameter of the halogenated resin bed; wherein the fluid velocity is calculated according to Equation (5):

$$\text{fluid velocity} = \frac{F}{A} \qquad (5)$$
$$= \frac{F}{\frac{1}{4}\pi D^2}$$

where F is the volumetric flow rate of the water treatment system and A is the cross-sectional area of the halogenated resin bed; and wherein the halogenated resin bed improves the removal of contaminates relative to a corresponding water treatment system having an aspect ratio greater than 0.8.

In certain embodiments, the halogenated resin bed may comprise an EBCT greater than 1 second. In at least one embodiment, the EBCT may be between 1 second and 30 seconds. In at least one embodiment, the EBCT may be between 3 seconds and 15 seconds. In at least one embodiment, the EBCT may be between 8 seconds and 13 seconds. In at least one embodiment, the halogenated resin bed may comprise an EBCT less than 1 second.

In certain embodiments, the halogenated resin bed may comprise an aspect ratio less than 1. In at least one embodiment, the halogenated resin bed may comprise an aspect ratio less than 0.8. In at least one embodiment, the halogenated resin bed may comprise an aspect ratio between 0.4 and 0.8. In at least one embodiment, the halogenated resin bed may comprise an aspect ratio less than 0.4. In at least one embodiment, the halogenated resin bed may comprise an aspect ratio between 0.3 and 0.4. In at least one embodiment, the halogenated resin bed may comprise an aspect ratio less than 0.3.

In certain embodiments, the halogenated resin bed may comprise a fluid velocity less than 0.5 cm/s. In at least one embodiment, the fluid velocity may be between 0.3 cm/s and 0.5 cm/s. In at least one embodiment, the fluid velocity may be less than 0.3 cm/s. In at least one embodiment, the fluid velocity may be between 0.15 cm/s and 0.24 cm/s. In at least one embodiment, the fluid velocity may be less than 0.15 cm/s. In at least one embodiment, the fluid velocity may be greater than 0.5 cm/s.

In certain embodiments, the water treatment system may comprise a log 4 to log 5 reduction, a log 5 to log 6 reduction, or a log 6 to log 7 reduction. In at least one embodiment, the water treatment system may comprise a microbial kill greater than 3. In at least one embodiment, the water treatment system may comprise a microbial kill greater than 4.

In certain embodiments, the shape of the halogenated resin bed may comprise a polyhedron, a non-polyhedron, and any combination thereof. In at least one embodiment, the halogenated resin bed may generally comprise a cube, a tetrahedron, a prism, a cylinder, a sphere, a cone, a torus, a pyramid and any combination thereof. In certain embodiments, the cross-sectional dimension of the halogenated resin bed may generally comprise a polygon, a non-polygon, and any combination thereof. In at least one embodiment, the cross-sectional dimension of the halogenated resin bed may generally comprise a circle, ellipse, parallelogram, rectangle, square, trapezoid, triangle and any combination thereof.

In certain embodiments, the water treatment system may generally comprise a generally cylindrical halogenated resin bed. In at least one embodiment, the halogenated resin bed may comprise a cylinder. In at least one embodiment, the diameter of the halogenated resin bed may be greater than two times its length. In at least one embodiment, the diameter of the halogenated resin bed may be greater than five times its length. In at least one embodiment, the diameter of the halogenated resin bed may be greater than ten times its length. In at least one embodiment, the diameter of the halogenated resin bed may be greater than fifty times its length. In at least one embodiment, the diameter of the halogenated resin bed may be greater than one hundred times its length. In at least one embodiment, the diameter of the halogenated resin bed may be equal to its length.

Figure 1:
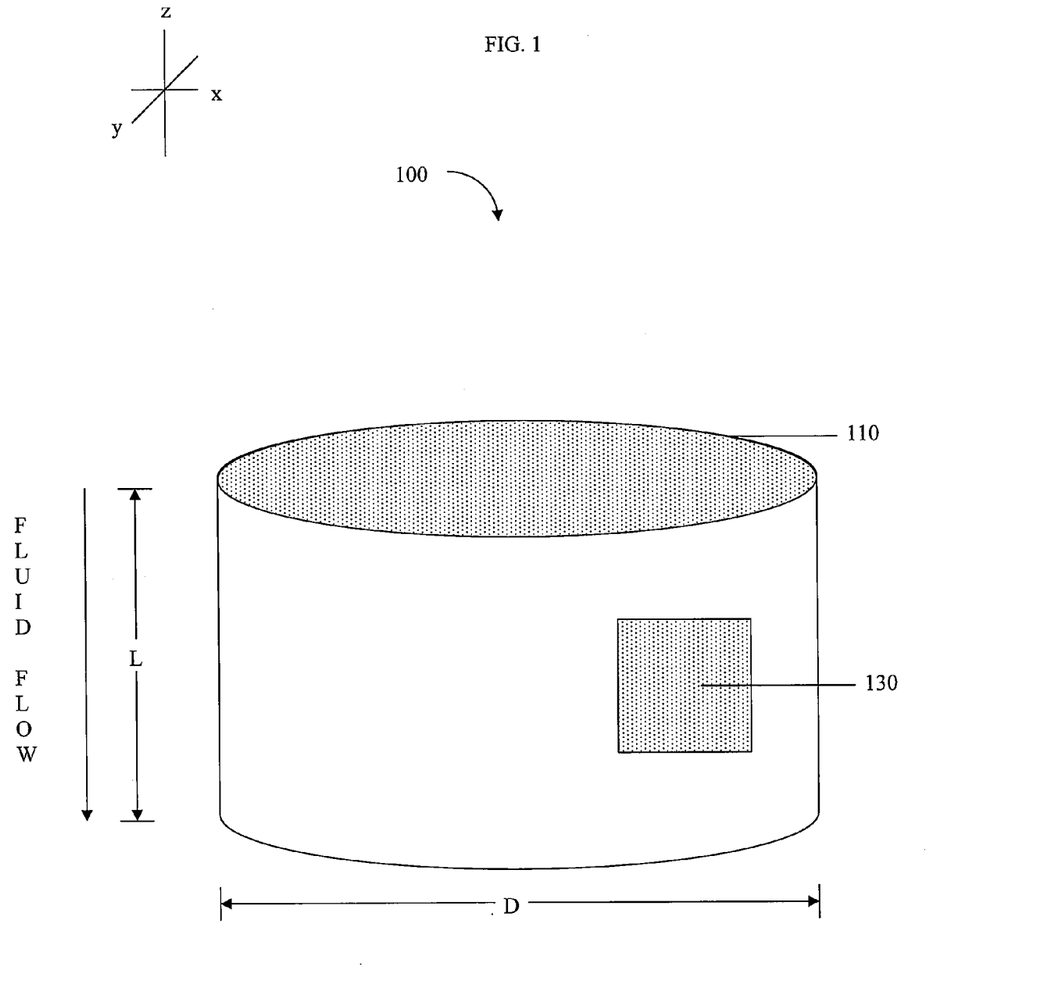
FIG. 1 illustrates a perspective view of an embodiment of a water treatment system.
Figure 2:
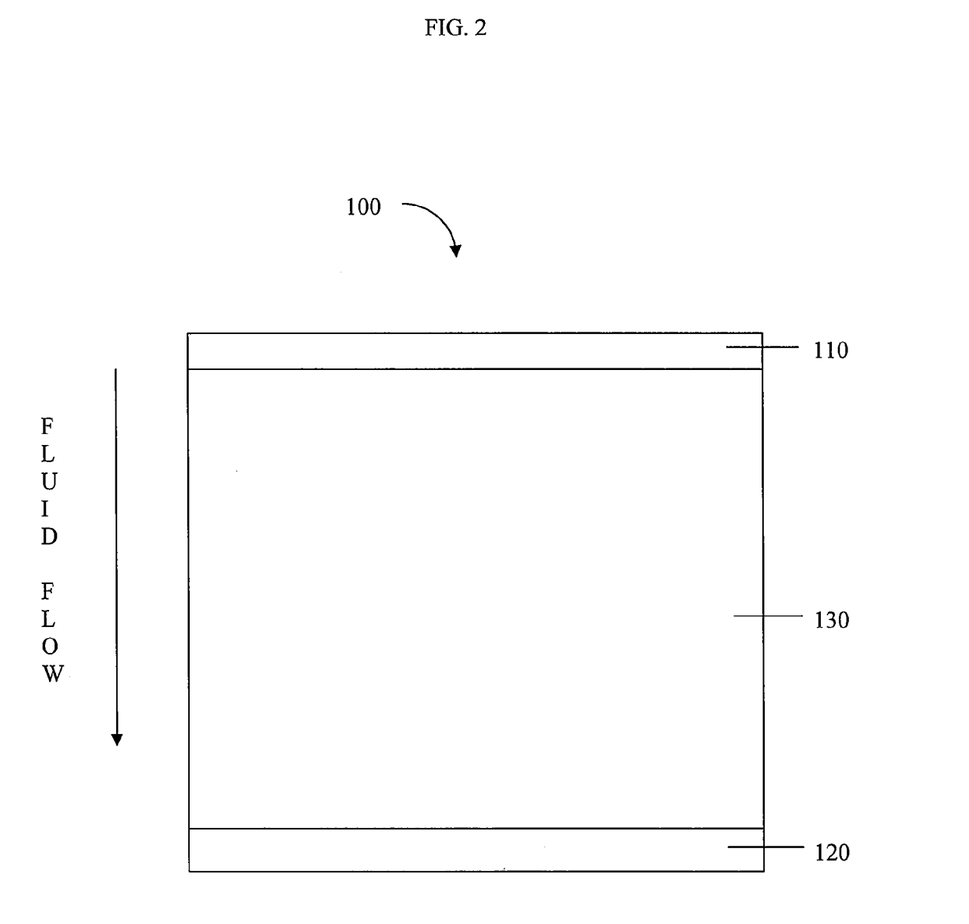
FIG. 2 illustrates a sectional view of an embodiment of a water treatment system.

Referring to FIGS. 1 and 2, certain embodiments of a water treatment system 100 may generally comprise at least one inlet 110 in fluid communication with at least one outlet 120, and a halogenated resin bed 130 intermediate the inlet 110 and outlet 120. In at least one embodiment, the inlet 110 may be adjacent the halogenated resin bed 130. In at least one embodiment, the outlet 120 may be adjacent the halogenated resin bed 130. In at least one embodiment, the influent may enter the water treatment system 100 via the inlet 110. In at least one embodiment, the effluent may exit the water treatment system 100 via the outlet 120. In at least one embodiment, the direction of fluid flow may be from the inlet 110 towards the outlet 120. In at least one embodiment, the direction of fluid flow may be from the inlet 110 towards the outlet 120 along the z-axis.

In certain embodiments, a water treatment system may generally comprise at least one halogenated resin. In at least one embodiment, the water treatment system may comprise two or more halogenated resins beds. In at least one embodiment, the halogenated resin may comprise halogens selected from the group consisting of chlorine, bromine, iodine, and any combination thereof. In at least one embodiment, the halogenated resin may be selected from the group consisting of chlorinated resins, brominated resins, iodinated resins, low-residual halogenated resins, and any combination thereof. In at least one embodiment, the halogenated resin may comprise an iodinated resin. In at least one embodiment, the low-residual halogenated resin may comprise a low-residual iodinated resin.

In certain embodiments, the halogenated resin may comprise an iodinated resin comprising an iodinated base ion exchange resin of polyiodide anions bound to the quaternary amine fixed charges of a polymer. In at least one embodiment, the iodinated resin may comprise a Microbial Check Valve or MCV® Resin. The MCV® Resin may comprise an iodinated strong base ion exchange resin of polyiodide anions bound to the quaternary amine fixed positive charges of a polystyrene-divinylbenzene copolymer. In at least one embodiment, the halogenated resin may comprise a regenerative MCV® Resin. In at least one embodiment, the regenerative MCV® Resin may comprise a packed bed of crystalline elemental iodine to produce a saturated aqueous solution that may replenish the depleted MCV® Resin.

In certain embodiments, the halogenated resin may comprise a low-residual halogenated resin. As generally used herein, the term "low-residual" halogenated resin refers to a halogenated resin that may release less halogens than a "classic" halogenated resin when exposed to deionized water. In at least one embodiment, the iodine released from a low-residual iodinated resin may be less than 4 ppm of iodine. In at least one embodiment, the iodine released from a low-residual iodinated resin may range from less than 0.1-3 ppm. In at least one embodiment, the iodine released from a low-residual iodinated resin may range from 0.1-2 ppm. In at least one embodiment, the iodine released from a low-residual iodinated resin may range from 0.2-1 ppm. In at least one embodiment, the iodine released from a low-residual iodinated resin may range from 0.5-1 ppm. In at least one embodiment, the iodine released from a low-residual iodinated resin may range from 0.2-0.5 ppm. In at least one embodiment, the iodine released from a low-residual iodinated resin may be less than 0.2 ppm.

In certain embodiments, a water treatment system may generally comprise at least one sorbent media in fluid communication with the halogenated resin bed. In at least one embodiment, the water treatment system may comprise two or more sorbent media. In at least one embodiment, the sorbent media may be intermediate the inlet and the outlet. In at least one embodiment, the sorbent media may comprise at least one halogen-scavenger barrier. In at least one embodiment, the halogen-scavenger barrier may be downstream from the halogenated resin bed. In at least one embodiment, the halogen-scavenger barrier may be intermediate the halogenated resin bed and the outlet. In at least one embodiment, the halogen-scavenger barrier may be in direct fluid communication with the halogenated resin bed. In at least one embodiment, the halogen-scavenger barrier may be adjacent to the outlet.

As generally used herein, the term "halogen-scavenger barrier" refers to any material that may remove or reduce the concentration of halogens in a fluid by adsorbing or absorbing the halogens, and/or converting the halogens to an ionic form.

In at least one embodiment, the halogen-scavenger barrier may comprise an absorbent material. In at least one embodiment, the halogen-scavenger barrier may remove or reduce the concentration of halogens in a fluid by absorption, or micropore size filtration. In at least one embodiment, the halogen-scavenger barrier may comprise an adsorbent material. In at least one embodiment, the halogen-scavenger barrier may remove or reduce the concentration of halogens in a fluid by adsorption, or electrochemical charge filtration.

In at least one embodiment, the halogen-scavenger barrier may remove or reduce the concentration of halogens in the fluid passing therethrough. In at least one embodiment, the halogen-scavenger barrier may remove substantially all of the halogens in the fluid. In at least one embodiment, the halogen-scavenger barrier may leave residual iodine in the fluid. In at least one embodiment, residual iodine may be effective to retard or inhibit microbial growth during storage, transport, and/or dispensing of the fluid.

In at least one embodiment, the halogen-scavenger barrier may comprise carbon, activated carbon, ion exchange resins, and any combination thereof. In at least one embodiment, the halogen-scavenger barrier may comprise an ion exchange resin. In at least one embodiment, the halogen-scavenger barrier may comprise a strong-base anion exchange resin. In at least one embodiment, the ion exchange resin may comprise trialkyl amine groups each comprising alkyl groups containing from 3 to 8 carbon atoms. In at least one embodiment, the ion exchange resin may comprise Iodosorb®, commercially available from Water Security Corporation, Sparks, Nev. Iodosorb® may generally comprise trialkyl amine groups each comprising alkyl groups containing 3 to 8 carbon atoms that may be capable of removing halogens, including iodine and/or iodide, from water.

In certain embodiments, the water treatment system may comprise a chamber comprising a void space. In at least one embodiment, the chamber may be intermediate the inlet and the halogenated resin bed. In at least one embodiment, the chamber may be intermediate the halogenated resin bed and the outlet. In at least one embodiment, the chamber may be intermediate the halogenated resin bed and the halogen-scavenger barrier. In at least one embodiment, the chamber may be in direct fluid communication with the halogenated resin bed.

In certain embodiments, the water treatment system may comprise a housing. In at least one embodiment, the housing may comprise a longitudinal axis along the z-axis wherein at least one of the inlet, outlet, halogenated resin bed, halogen-scavenger barrier, and chamber may be axially spaced along the longitudinal axis. In at least one embodiment, the direction of fluid flow may be from the inlet towards the outlet along the longitudinal axis. The housing may comprise any suitable material, such as, for example, but not limited to, glass, metal, ceramic, plastic, and any combination thereof. The housing may comprise any suitable shape, such as, for example, but not limited to, a polyhedron, a non-polyhedron, and any combination thereof.

In certain embodiments, the dimensions of the halogenated resin bed may be independently configured to improve the removal of contaminants passing therethrough. In at least one embodiment, the dimensions of the halogenated resin bed may be independently configured to improve the aspect ratio. In at least one embodiment, at least one of the length, width, depth, height, diameter, perimeter, circumference, cross-sectional dimension, area, volume and any combination thereof of the halogenated resin bed may be independently configured to improve the aspect ratio. In at least one embodiment, the water treatment system may comprise a generally cylindrical halogenated resin bed wherein the length and diameter may be independently configured to improve the aspect ratio. In at least one embodiment, the aspect ratio may be improved by increasing the diameter and/or decreasing the length of the halogenated resin bed.

In at least one embodiment, the dimensions of the halogenated resin bed may be independently configured to improve the aspect ratio by providing an aspect ratio less than 1. In at least one embodiment, the dimensions of the halogenated resin bed may be independently configured to improve the aspect ratio by providing an aspect ratio less than 0.8. In at least one embodiment, the dimensions of the halogenated resin bed may be independently configured to improve the aspect ratio by providing an aspect ratio less than 0.4. In at least one embodiment, the dimensions of the halogenated resin bed may be independently configured to improve the aspect ratio by providing an aspect ratio between 0.3 and 0.4. In at least one embodiment, the dimensions of the halogenated resin bed may be independently configured to improve the aspect ratio by providing an aspect ratio less than 0.3.

In certain embodiments, the dimensions of the halogenated resin bed may be independently configured to improve the fluid velocity of the fluid passing therethrough. In at least one embodiment, at least one of the length, width, depth, height, diameter, perimeter, circumference, cross-sectional dimension, area, volume and any combination thereof of the halogenated resin bed may be independently configured to improve the fluid velocity. In at least one embodiment, at least one of the length, width, depth, height, diameter, perimeter, circumference, cross-sectional dimension, area, volume and any combination thereof of the halogenated resin bed may be independently configured to decrease the fluid velocity. In at least one embodiment, the water treatment system may comprise a generally cylindrical halogenated resin bed wherein the length and diameter may be independently configured to improve the fluid velocity. In at least one embodiment, the fluid velocity may be improved by increasing the diameter and/or decreasing the length of the halogenated resin bed. In at least one embodiment, the fluid velocity may be improved by increasing the cross-sectional area of the halogenated resin bed.

In at least one embodiment, the dimensions of the halogenated resin bed may be independently configured to improve the fluid velocity by decreasing the fluid velocity. In at least one embodiment, the dimensions of the halogenated resin bed may be independently configured to improve the fluid velocity by providing a fluid velocity less than 0.5 cm/s. In at least one embodiment, the dimensions of the halogenated resin bed may be independently configured to improve the fluid velocity by providing a fluid velocity may be between 0.3 cm/s and 0.5 cm/s. In at least one embodiment, the dimensions of the halogenated resin bed may be independently configured to improve the fluid velocity by providing a fluid velocity less than 0.3 cm/s. In at least one embodiment, the dimensions of the halogenated resin bed may be independently configured to improve the fluid velocity by providing a fluid velocity may be between 0.15 cm/s and 0.24 cm/s. In at least one embodiment, the dimensions of the halogenated resin bed may be independently configured to improve the fluid velocity by providing a fluid velocity may be less than 0.15 cm/s. In at least one embodiment, the dimensions of the halogenated resin bed may be independently configured to improve the fluid velocity by providing a fluid velocity greater than 0.5 cm/s.

In certain embodiments, the dimensions of the halogenated resin bed, halogen-scavenger barrier, and/or chamber may be independently configured to improve the fluid velocity of the fluid passing through the halogenated resin bed. In at least one embodiment, the length, width, depth, height, diameter, perimeter, circumference, cross-sectional dimension, area, and/or volume of the halogen-scavenger barrier and/or chamber may be less than, greater than, or equal to the length, width, depth, height, diameter, perimeter, circumference, cross-sectional dimension, area, and/or volume of the halogenated resin bed. In at least one embodiment, the length, width, depth, height, diameter, perimeter, circumference, cross-sectional dimension, area, and/or volume of the halogen-scavenger barrier may be less than, greater than, or equal to the length, width, depth, height, diameter, perimeter, circumference, cross-sectional dimension, area, and/or volume of the chamber.

According to the general principles of water treatment and design described above, the removal of contaminants by a water treatment system comprising a halogenated resin bed comprising an aspect ratio less than 0.8 may be predicted to be similar to the removal of contaminants by a water treatment system comprising a halogenated resin bed comprising an aspect ratio of at least 2 if each water treatment system comprises similar volumes of halogenated resin beds and EBCTs. As described below, a water treatment system generally comprising a halogenated resin bed comprising an EBCT greater than 1 second, an aspect ratio less than 0.8, and a fluid velocity less than 0.5 cm/s may improve the removal of contaminants relative to a corresponding water treatment system comprising a halogenated resin bed comprising an aspect ratio greater than 0.8. Without intending to be bound to any particular theory, the removal of contaminants by a water treatment system comprising a halogenated resin bed may also depend on the aspect ratio of the halogenated resin bed and/or the fluid velocity of water passing through the halogenated resin bed.

A comparison of a certain embodiment of a water treatment system generally comprising a halogenated resin bed comprising an empty bed contact time greater than 1 second, an aspect ratio less than 0.8, and a fluid velocity less than 0.5 cm/s ("System 1") and a corresponding water treatment system comprising a halogenated resin bed comprising an aspect ratio greater than 0.8 ("System 2") in which each water treatment system comprises similar volumes of halogenated resin beds and EBCTs is illustrated in Table 1.

TABLE 1

| System 1 | System 2 |
| --- | --- |
| Flow rate = 240 mL/min = 60 mL/s | Flow rate = 240 mL/min = 60 mL/s |
| EBCT = 15 seconds | EBCT = 15 seconds |
| Volume = 60 mL | Volume = 60 mL |
| Length = 2.3 cm | Length = 19 cm |
| Diameter = 5.76 cm | Diameter = 2 cm |
| Aspect ratio = 0.4 | Aspect ratio = 9.5 |
| Fluid Velocity = 0.15 cm/sec. | Fluid Velocity = 1.27 cm/sec. |

As shown in Table 1, the fluid velocity of the water treatment system comprising a halogenated resin bed comprising a lower aspect ratio may be less than the fluid velocity of a corresponding water treatment system comprising a halogenated resin bed comprising a higher aspect ratio. Without intending to be bound to any particular theory, the change in fluid velocity may be depend on at least the diameter of the halogenated resin bed and/or the cross-sectional dimension of the halogenated resin bed. Referring to Equation (5), the relationship between the fluid velocity and the diameter of the halogenated resin bed may be described generally by Equation (6):

$$\text{fluid velocity} \propto \frac{1}{D^2} \quad (6)$$

As shown by Equation (6), the fluid velocity may be inversely proportional to the square of the diameter of the halogenated resin bed. Accordingly, the fluid velocity of a water treatment system comprising a halogenated resin bed comprising a larger diameter may be less than the fluid velocity of a corresponding water treatment system comprising a halogenated resin bed comprising a smaller diameter.

In certain embodiments, a water treatment system generally comprising a halogenated resin bed comprising an EBCT greater than 1 second, an aspect ratio less than 0.8, and a fluid velocity less than 0.5 cm/s may comprise a fluid velocity less than two times the fluid velocity of a corresponding water treatment system comprising a halogenated resin bed comprising an aspect ratio greater than 0.8. In at least one embodiment, the halogenated resin bed may comprise a fluid velocity less than five times the fluid velocity of the corresponding halogenated resin bed. In at least one embodiment, the halogenated resin bed may comprise a fluid velocity less than ten times the fluid velocity of the corresponding halogenated resin bed. In at least one embodiment, the halogenated resin bed may comprise a fluid velocity less than fifty times the fluid velocity of the corresponding halogenated resin bed.

In certain embodiments, a water treatment system generally comprising a halogenated resin bed comprising an EBCT greater than 1 second, an aspect ratio less than 0.8, and a fluid velocity less than 0.5 cm/s may improve the removal of contaminants from water by decreasing the fluid velocity therethrough relative to a corresponding water treatment system comprising a halogenated resin bed comprising an aspect ratio greater than 0.8. In at least one embodiment, the water treatment system may substantially improve the removal of contaminants by decreasing the fluid velocity therethrough relative to a corresponding water treatment system comprising a halogenated resin bed comprising an aspect ratio greater than 0.8. Without intending to be bound to any particular theory, the improvement may be described by a velocity dependent capture phenomena. In at least one embodiment, a halogenated resin bed comprising a EBCT greater than 1 second, an aspect ratio less than 0.8, and a fluid velocity less than 0.5 cm/s may exert a force on contaminants passing therethrough while in proximity to fixed functional sites on the halogenated resin bed over a longer period of time than a corresponding halogenated resin bed comprising an aspect ratio greater than 0.8. Without intending to be bound to any particular theory, the longer period of time may improve the microbial kill and/or log reduction value of the water treatment system.

In at least one embodiment, the water treatment system may improve the removal of contaminates by at least a log 0.4 reduction when both systems are measured at a volumetric flow rate of 150 mL/min and an MS2 influent concentration of 5 Log PFU/mL. In at least one embodiment, the water treatment system may improve the removal of contaminates by a log 0.4 reduction to log 3.5 reduction when both systems are measured at a volumetric flow rate of 150 mL/min and an MS2 influent concentration of 5 Log PFU/mL. In at least one embodiment, the water treatment system may improve the removal of contaminates by at least a log 3.0 reduction when both systems are measured at a volumetric flow rate of 150 mL/min and an MS2 influent concentration of 5 Log PFU/mL. In at least one embodiment, the water treatment system may improve the removal of contaminates by a log 0.5 reduction to log 1 reduction when both systems are measured at a volumetric flow rate of 150 mL/min and an MS2 influent concentration of 5 Log PFU/mL.

D. EXAMPLES

The various embodiments of water treatment systems described herein may be better understood when read in conjunction with the following representative examples. The following examples are included for purposes of illustration and not limitation.

A challenge experiment may be used to determine the ability of a water treatment system to remove contaminants. For example, a challenge, or a known quantity of a selected microbiolgical contaminant, may be added to the influent. The amount of the contaminant in the influent and effluent may be measured to determine the filtration capacity or microbial inactivation capacity of the water treatment system.

Certain embodiments of the water treatment system described herein are tested for their ability to remove contaminants from contaminated water. The virus MS2 coliphage may be chosen as the surrogate test organism. The influent and effluent are tested for MS2 coliphage before and after contact with the halogenated resin bed.

Example 1

A challenge experiment of a certain embodiment of the water treatment system described herein is compared to a corresponding water treatment system having an aspect ratio greater than 0.8. In particular, approximately 5 Log PFU/mL of MS2 in 750 mL de-chlorinated tap water at room temperature is introduced to the water treatment system via the inlet and contacts a MCV® iodinated resin and is dispensed through the outlet. The results are shown in Table 2.

TABLE 2

| Treatment | Column | |
| --- | --- | --- |
| | Plastic | Glass |
| Diameter (cm) | 4.2 | 2.5 |
| MCV (mL) | 20 | 20 |
| Feed water flow rate | 150 | 150 |
| Aged volume (L) | 1000 | 1000 |
| Iodine elution | | |
| Iodine (I$_2$) | 1.62 | 1.48 |
| Iodide (I) | 1.92 | 1.71 |
| MS2 challenge | | |
| Challenge volume (mL) | 750 | 750 |
| Challenge flow rate (mL/min) | 150 | 150 |
| Influent MS2 | 5.00 | 5.00 |
| Effluent MS2 | 2.85 | 3.70 |
| Log removal | 2.15 | 1.30 |

Example 2

A challenge experiment of a certain embodiment of the water treatment system described herein is compared to a corresponding water treatment system having an aspect ratio greater than 0.8. In particular, approximately 5.15 Log PFU/mL of MS2 in 750 mL de-chlorinated tap water at room temperature is introduced to the water treatment system via the inlet and contacts a MCV® iodinated resin and is dispensed through the outlet. The results are shown in Table 3.

Replicate plating accounts for the two log reduction values for each water treatment system.

TABLE 3

| Treatment | Column characteristics | |
| --- | --- | --- |
| | Plastic | Glass |
| Diameter (cm) | 4.2 | 2.5 |
| MCV (mL) | 20 | 20 |
| Feed water flow rate | 150 | 150 |
| Aged volume (L) | 804 | 804 |
| Iodine elution | | |
| Iodine (I$_2$) | 1.35 | 1.14 |
| Iodide (I) | 1.71 | 1.54 |
| MS2 challenge | | |
| Challenge volume (mL) | 750 | 750 |
| Challenge flow rate (mL/min) | 150 | 150 |
| Influent MS2 (Log PFU/mL) | 5.15 | 5.15 |
| Effluent MS2 (Log PFU/mL) | 2.96/3.04 | 3.52/3.95 |
| Log removal (Log PFU/mL) | 2.18/2.10 | 1.63/1.19 |

Example 3

A challenge experiment of a certain embodiment of the water treatment system described herein is compared to a corresponding water treatment system having an aspect ratio greater than 0.8. In particular, approximately 5.53 Log PFU/mL of MS2 in de-chlorinated tap water at room temperature is introduced to the water treatment system via the inlet and contacts a MCV® iodinated resin and is dispensed through the outlet. The results are shown in Table 4. As generally used herein, the term "ND" refers to not detectable or below the detection limit.

TABLE 4

| Treatment | Column characteristics | |
| --- | --- | --- |
| | Plastic | Glass |
| Diameter (cm) | 4.2 | 2.5 |
| MCV (mL) | 48 | 48 |
| Feed water flow rate | 229 | 235 |
| Aged volume (L) | | |
| Iodine elution | | |
| Iodine (I$_2$) | | |
| Iodide (I) | | |
| MS2 challenge | | |
| Challenge volume (mL) | 456 | 470 |
| Challenge flow rate (mL/min) | 229 | 235 |
| Influent MS2 (Log PFU/mL) | 5.53 | 5.53 |
| Effluent MS2 (Log PFU/mL) | ND | 3.53 |
| Log removal (Log PFU/mL) | 5.53 | 2.00 |

All documents cited herein are, in relevant part, incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to the present invention.

While particular embodiments of water treatment systems have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific devices and methods described herein, including alternatives, variants, additions, deletions, modifications and substitutions. This disclosure, including the appended claims, is intended to cover all such equivalents that are within the spirit and scope of this invention.

What is claimed is:

1. A water treatment system comprising:
an inlet in fluid communication with an outlet; and
a generally cylindrical halogenated resin bed intermediate the inlet and outlet;
wherein the halogenated resin bed comprises an empty bed contact time greater than 1 second, an aspect ratio of less than 0.8, and a fluid velocity of less than 0.5 cm/s;
wherein the aspect ratio is calculated according to the following equation:

$$\text{aspect ratio} = \frac{L}{D}$$

where L is the length of the halogenated resin bed and D is the diameter of the halogenated resin bed;
wherein the fluid velocity is calculated according to the following equation:

$$\text{fluid velocity} = \frac{F}{A} = \frac{F}{\frac{1}{4}\pi D^2}$$

where F is the volumetric flow rate of the water treatment system and A is the cross-sectional area of the halogenated resin bed.

2. The water treatment system of claim 1 wherein the aspect ratio is 0.4 to 0.8.

3. The water treatment system of claim 1 wherein the aspect ratio is less than 0.4.

4. The water treatment system of claim 1 wherein the aspect ratio is 0.3 to 0.4.

5. The water treatment system of claim 1 wherein the aspect ratio is less than 0.3.

6. The water treatment system of claim 1 wherein the fluid velocity is less than 0.3 cm/s.

7. The water treatment system of claim 1 wherein the fluid velocity is 0.15 cm/s to 0.24 cm/s.

8. The water treatment system of claim 1 wherein the fluid velocity is less than 0.15 cm/s.

9. The water treatment system of claim 1 wherein the empty bed contact time is between 1 second to 30 seconds.

10. The water treatment system of claim 1 wherein the empty bed contact time is between 3 second to 15 seconds.

11. The water treatment system of claim 1 wherein the empty bed contact time is between 8 seconds to 13 seconds.

12. A generally cylindrical halogenated resin bed comprising an empty bed contact time greater than 1 second, an aspect ratio of less than 0.8, and a fluid velocity of less than 0.5 cm/s;
wherein the aspect ratio is calculated according to the following equation:

$$\text{aspect ratio} = \frac{L}{D}$$

where L is the length of the halogenated resin bed and D is the diameter of the halogenated resin bed;
wherein the fluid velocity is calculated according to the following equation:

$$\text{fluid velocity} = \frac{F}{A} = \frac{F}{\frac{1}{4}\pi D^2}$$

where F is the volumetric flow rate of the water treatment system and A is the cross-sectional area of the halogenated resin bed.

13. The halogenated resin bed of claim 12, wherein the halogenated resin bed comprises an iodinated resin.

* * * * *